United States Patent [19]

Herrera

[11] Patent Number: 4,877,289
[45] Date of Patent: Oct. 31, 1989

[54] CART CAR CHAIR

[76] Inventor: Mauro Herrera, 11779 Francis Scobee, El Paso, Tex. 79936

[21] Appl. No.: 210,742

[22] Filed: Jun. 23, 1988

[51] Int. Cl.⁴ .............................................. A47D 1/10
[52] U.S. Cl. .............................. 297/250; 280/33.993; 297/130
[58] Field of Search .............................. 297/250, 130; 280/33.99 A, 33.99 B, 33.99 R, 289 A

[56] References Cited

U.S. PATENT DOCUMENTS

| | | | |
|---|---|---|---|
| 3,290,050 | 12/1966 | Ezquerra | 297/130 X |
| 3,351,380 | 11/1967 | Sprague | 280/33.99 BX |
| 4,324,430 | 4/1982 | Dimas, Jr. et al. | 297/250 |
| 4,598,945 | 7/1986 | Hopkins | 297/250 |
| 4,634,177 | 1/1987 | Meeker | 297/250 |
| 4,743,063 | 5/1988 | Foster, Jr. | 297/130 |
| 4,750,783 | 6/1988 | Irby et al. | 297/130 X |

Primary Examiner—Peter R. Brown

[57] ABSTRACT

A true childs shopping cart chair that has a seating part that by means of a cutout at its center front allows areas to extend outward beyond the shopping cart on which to place the legs as well as a part that fits into the cart on which to sit the child. A back and side support apparatus attaches to the sitting part to form an even more stable chair for a child. And the child's shopping cart chair can be attached to a base for use in automobiles.

2 Claims, 4 Drawing Sheets

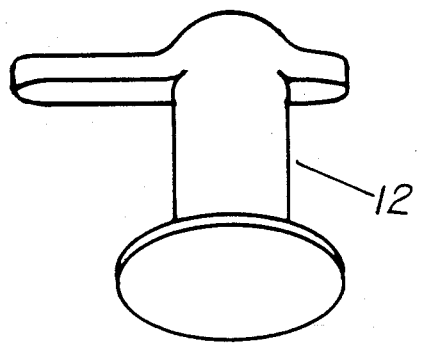

CART CAR CHAIR

BACKGROUND OF THE INVENTION

This invention relates to child seats for use in shopping carts and or automobiles.

The existing art consists of child carriers and automobile child seats which attempt to function one as the other and as shopping cart carriers. The existing art fails to provide what a shopping cart needs, a real chair.

This invention functions as a real chair for shopping carts, it does what a real chair should accomplish: provide a flat, stable sitting place within the shopping cart and, more importantly, provide a resting area both for the child's buttocks and the child's legs.

SUMMARY OF THE INVENTION

As the title of the invention indicates, it is first of all a shopping cart chair. It is unique in having a cutout at its front center which allows it to slip into and fit flatly within the child retaining cage of the shopping cart.

The cutout at its front center allows areas to extend outward and away from the retaining cage of the shopping cart. These extensions provide a resting area for the child's legs while the area within the shopping cart provides a resting area for the buttocks.

The invention consists of three main parts. The most important part is that on which the child will sit. Then there is a one piece back and side support which attaches to the sitting part. And then there is a base to which the shopping cart chair assembly may be attached for use in an automobile.

DETAILED DESCRIPTION AND PREFERRED EMBODIMENTS OF THE INVENTION

Figure 1:
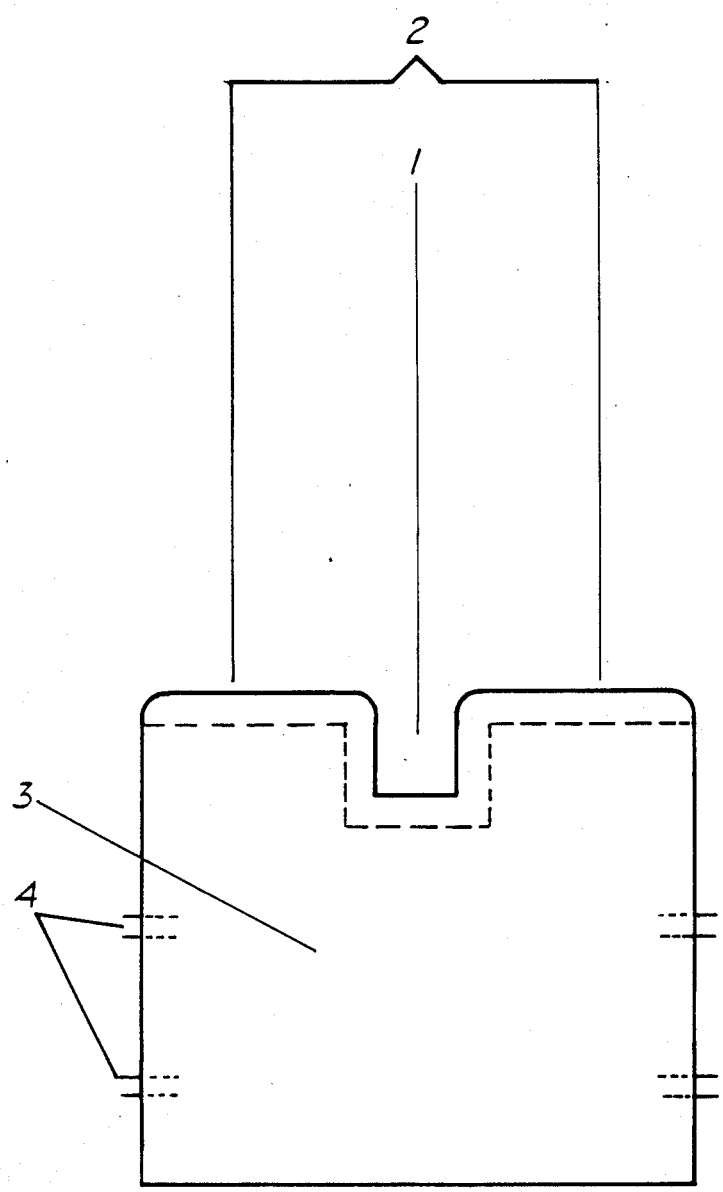
FIG. 1. Chair part
1. Cutout area
2. Extensions for legs
3. Seat
4. Threaded holes to attach to back and side support with screws FIG. 2. Back and side support (attached to chair part)
6. Back and side
7. Hole for auto seat belt
8. Hole for screws to attach to chair part FIG. 2A. Top view of FIG. 2.

FIG. 1 shows the chair part 3 of the invention. It would be placed in the shopping carts child sitting area; the child would sit upon it and a safety belt would hold both it and the child onto the shopping cart. Cutout section 1 allows extensions 2 to go outside the shopping cart's child sitting area and provide a comfortable leg rest for the child as well as for the buttocks. The true chair function increases child safety by maximizing comfort. Maximum comfort prevents restlessness, fidgiting and the leg movement by the child, therefore, there is less likelihood of the child falling from the cart. Cutout 1 allows the chair part to be made with extensions 2 of varied lengths to accommodate various ages of infants to toddlers.

Shopping cart manufactures can easily incorporate the chair sitting part into their products since the extensions 2 will not interfere with the folding movement needed in carts in order to store the cart with baskets inserted into each other.

Figure 2:
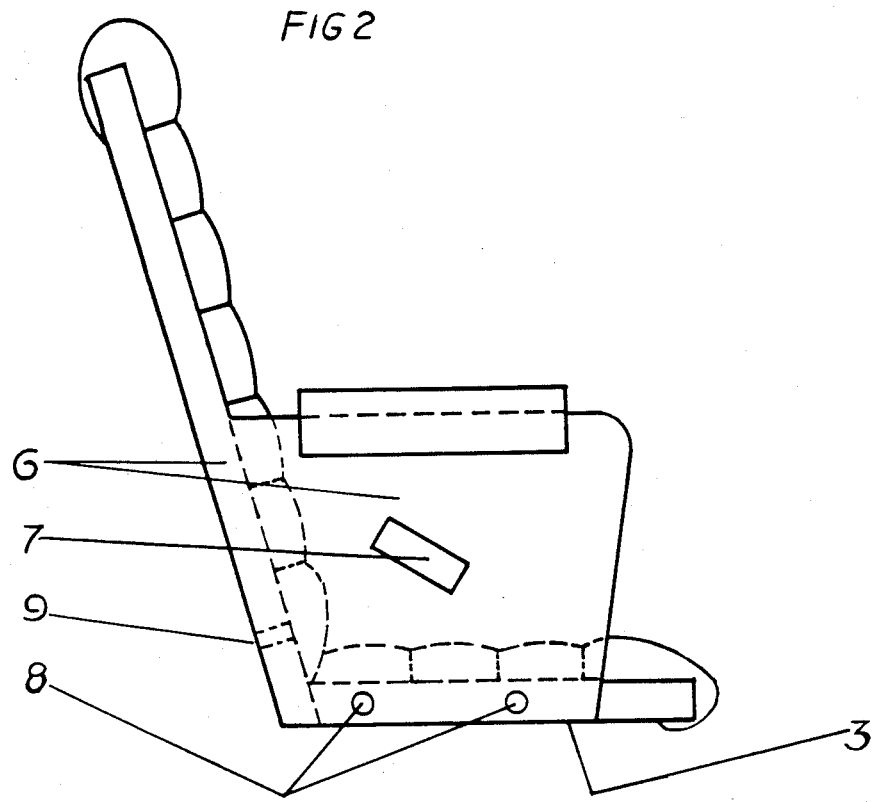
Figure 2A:
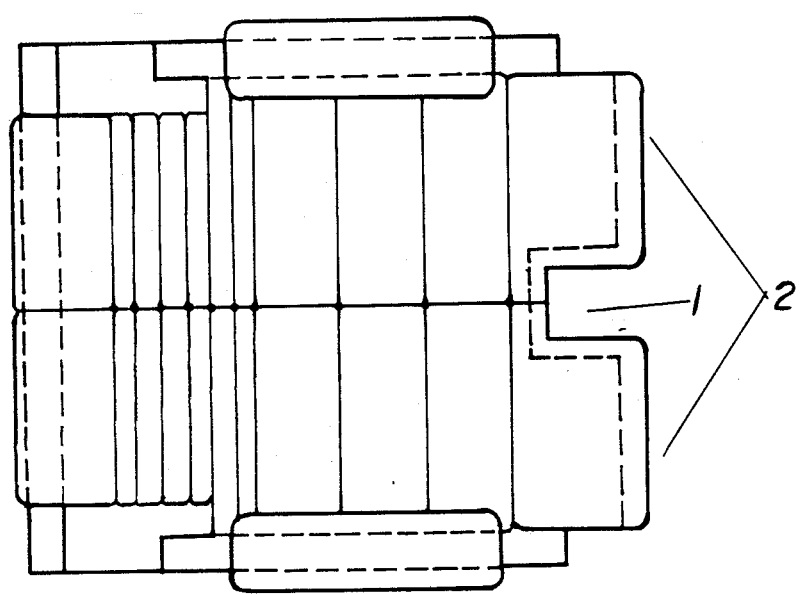

The FIG. 1 chair can be further improved in safety and comfort by attaching it by screws through holes 4 to the corresponding holes 8 of the one piece back and side support 6 shown in FIG. 2. Assembled as one unit the shopping cart chair fits flat onto the shopping cart child sitting area with solid support to the child's back, sides and legs. The entire chair and child would be held in place through holes 7 with a safety belt.

When the child is smaller the entire shopping cart chair would be used. Once the child is older only the chair sitting portion 1 would be used.

Figure 3:
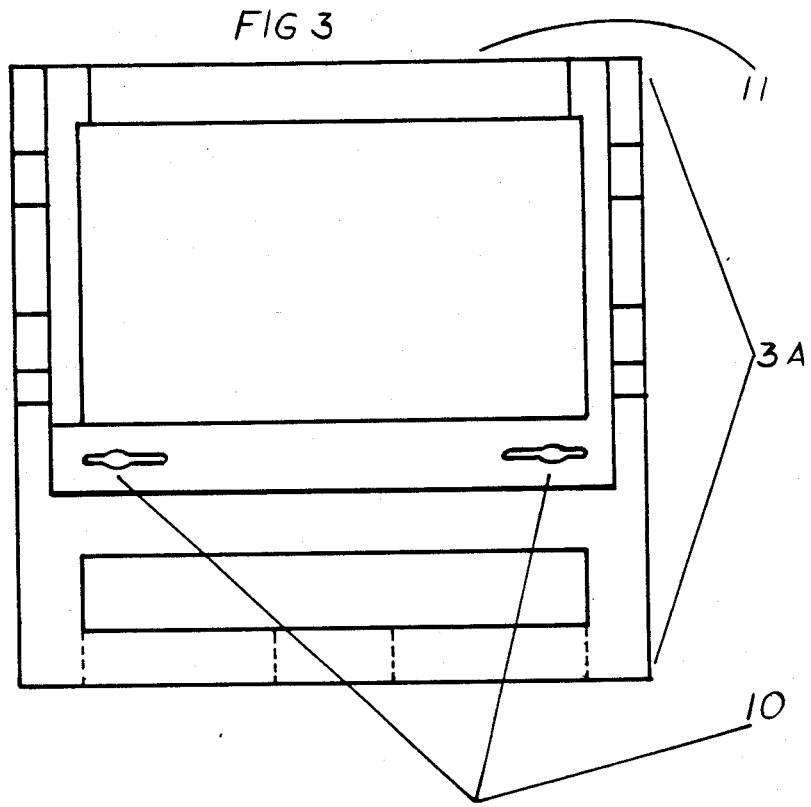
FIGS. 3, 3A. Base for using shopping cart chair in auto
12. Holes for the bolts used to attach shopping cart chair to base FIG. 4. Bolt to attach shopping cart chair to base
Figure 3A:
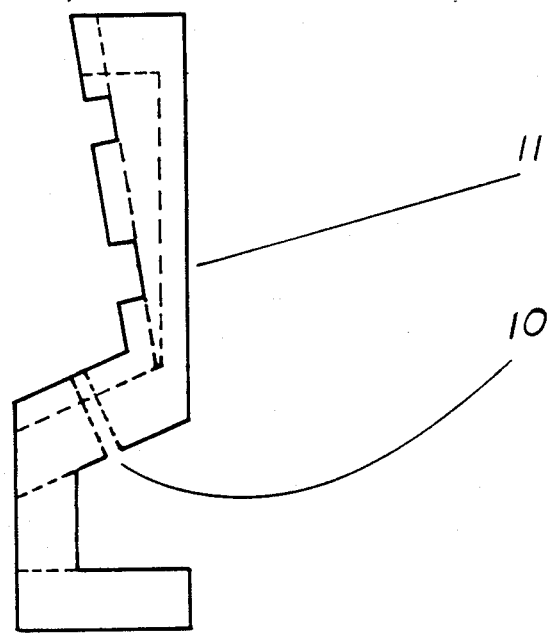

To use in an automobile, the shopping cart chair (as assembled in FIG. 2) would be attached via holes 9 to base 11 in FIG. 3 at holes 10 using bolts 12 in FIG. 4.

The invention would be sold in various pieces or combinations:
the sitting part,
the back and side support,
the sitting part with back and side support,
the base,
sitting part with back and side support with base,
screws to attach sitting part to back and side support,
bolts to attach back and side support to base,
and screws and bolts.

The sitting part would be available in different lengths and would be padded. The back and side support would be padded and available in different back and side heights.

I state that claims one through four previously submitted are cancelled, and I claim the following:

1. A shopping cart chair for children which consists of a chair seating part and a one piece back and side support part; said chair seating part is usable by itself or may be attached to the back and side support by means of screws to form a shopping cart chair that provides a stable and comfortable and safe restraint for children; said chair seating part having a cutout portion at its front center edge that allows the chair seating part to fit flatly in the shopping cart and wherein portions on each side of the cutout extend separately outward, outside and away from the shopping cart, and which are wide enough and long enough to provide a resting area for the child's legs; said shopping cart chair may, along with the child, be held in place on the shopping cart by means of a safety belt which passes through holes formed in said side support part.

2. A shopping cart child's chair as set forth in claim 1, and having openings formed in its rear portion whereby the chair may be attached by means of wing bolts to a separate solid base having a recess for receiving the chair therein to thereby form an automobile child's chair seat.

* * * * *